United States Patent
Gallner et al.

(10) Patent No.: US 9,088,436 B2
(45) Date of Patent: Jul. 21, 2015

(54) INTERCONNECTION OF SUBNETWORKS BY A UNIFORM NETWORK LAYER

(75) Inventors: Thomas Gallner, Regensburg (DE); Helmut Windl, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 852 days.

(21) Appl. No.: 12/741,145

(22) PCT Filed: Nov. 4, 2008

(86) PCT No.: PCT/EP2008/064929
§ 371 (c)(1),
(2), (4) Date: May 3, 2010

(87) PCT Pub. No.: WO2009/059965
PCT Pub. Date: May 14, 2009

(65) Prior Publication Data
US 2010/0265858 A1  Oct. 21, 2010

(30) Foreign Application Priority Data
Nov. 8, 2007 (DE) .......................... 10 2007 053 246

(51) Int. Cl.
*H04L 12/46* (2006.01)
*H04L 12/66* (2006.01)
*H04L 29/08* (2006.01)
(Continued)

(52) U.S. Cl.
CPC ............ *H04L 12/4616* (2013.01); *H04L 12/66* (2013.01); *H04L 67/12* (2013.01); *H04L 69/08* (2013.01); *H04L 69/32* (2013.01); *H04L 2012/40273* (2013.01)

(58) Field of Classification Search
CPC .............. H04L 67/12; H04L 29/12849; H04L 61/6027; H04L 2012/40215; H04L 12/64; H04L 12/66; H04L 69/32; H04L 2012/40273; H04L 12/4616
USPC ......... 370/310, 351, 352, 353, 357, 358, 464, 370/465, 466, 469, 480, 485, 486, 487, 489, 370/490; 709/249
See application file for complete search history.

(56) References Cited

U.S. PATENT DOCUMENTS 6,115,372 A * 9/2000 Dinha ........................... 370/352
6,246,688 B1 * 6/2001 Angwin et al. ............... 370/401
6,654,355 B1   11/2003 Marbach et al.
(Continued)

FOREIGN PATENT DOCUMENTS

DE     600 26 734 T2    9/2006
EP     1 168 760        1/2002
(Continued)

OTHER PUBLICATIONS

Maihofer, et al. "Design alternatives for IP in vehicles" VTC 2003-Spring. The 57th. IEEE Semiannual Vehicular Technology Conference. Apr. 22-25, 2003; vol. 3, pp. 1783-1787.

*Primary Examiner* — Obaidul Huq
(74) *Attorney, Agent, or Firm* — Cozen O'Connor

(57) ABSTRACT

A network system for motor vehicles, including at least two differently structured subnetworks which each have a data connection, the network layers of the at least two differently structured subnetworks having a similar structure. The protocol of the network layer is preferably the Internet Protocol.

11 Claims, 2 Drawing Sheets

(51) Int. Cl.
*H04L 12/40* (2006.01)
*H04L 29/06* (2006.01)

(56) References Cited

U.S. PATENT DOCUMENTS

| | | | |
|---|---|---|---|
| 7,672,251 B2* | 3/2010 | Chu et al. | 370/252 |
| 2002/0032789 A1 | 3/2002 | Bahren et al. | |
| 2004/0066786 A1* | 4/2004 | Catterall et al. | 370/400 |
| 2004/0081178 A1* | 4/2004 | Fujimori | 370/401 |
| 2005/0066035 A1* | 3/2005 | Williams et al. | 709/226 |
| 2005/0281223 A1 | 12/2005 | D'Annunzio | |
| 2006/0123474 A1 | 6/2006 | Hagg et al. | |
| 2006/0180709 A1* | 8/2006 | Breton et al. | 246/1 C |
| 2007/0063837 A1* | 3/2007 | McKenna et al. | 340/540 |
| 2007/0195808 A1* | 8/2007 | Ehrlich et al. | 370/408 |

FOREIGN PATENT DOCUMENTS

| | | |
|---|---|---|
| EP | 1 657 876 | 5/2006 |
| WO | WO 03/036917 | 5/2003 |

* cited by examiner

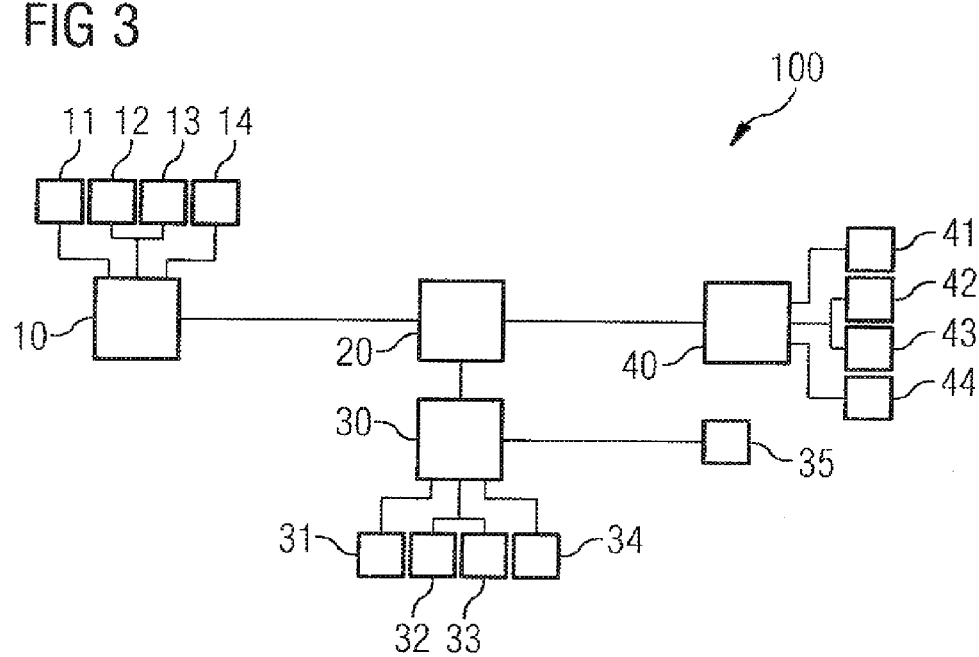
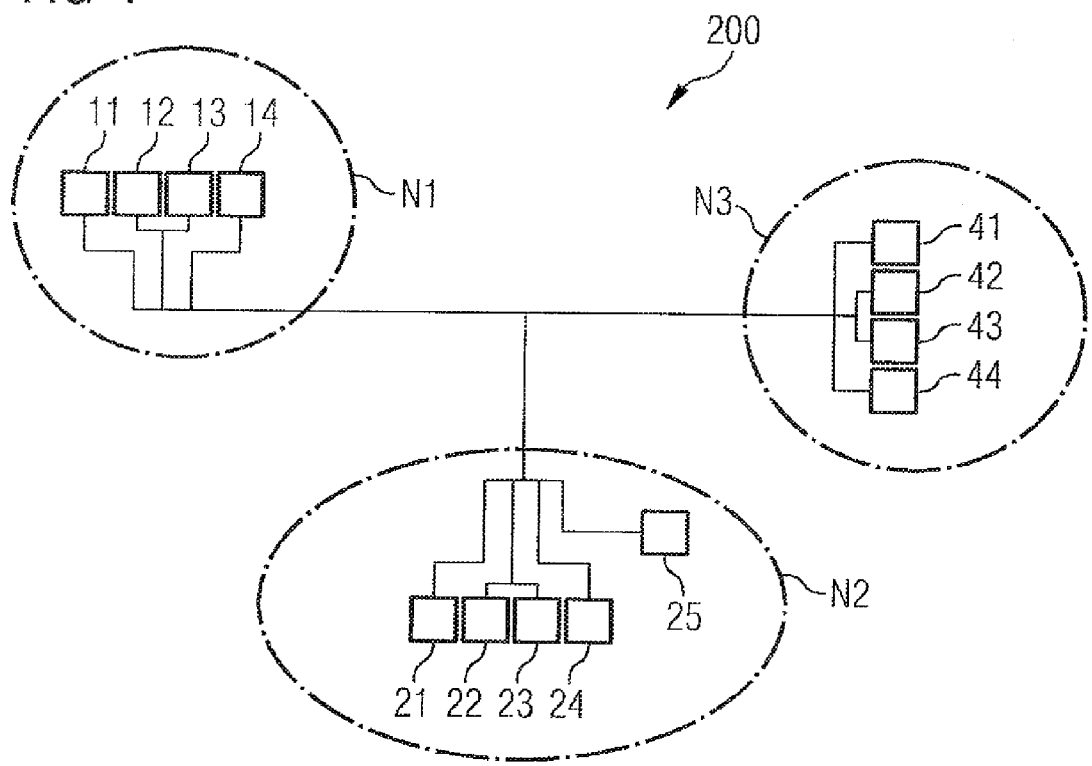

INTERCONNECTION OF SUBNETWORKS BY A UNIFORM NETWORK LAYER

PRIORITY CLAIM

This is a U.S. national stage of application No. PCT/EP2008/064929, filed on Nov. 4, 2008 which claims priority to the German Application No.: 10 2007 053 246.8, Filed: Nov. 8, 2007; the contents of which are incorporated here by reference.

BACKGROUND OF THE INVENTION

1. Field of the Invention

The invention relates to data interchange between different subnetworks in a motor vehicle.

2. Prior Art

Motor vehicles at present use several different subnetworks, each of which is specialized for performing certain tasks. The data interchange between the various subnetworks usually requires gateways that perform the requisite conversion of speed, protocol and signals between the various bus systems, such as CAN, LIN, MOST, FlexRay, and between the various data network systems, such as Ethernet, Bluetooth, UWB, W-LAN or WiMax. However, the relevant recoding of a message which is to be transmitted from one network to another network requires additional processor power and results in a further time delay in the data transmission. Furthermore, this conversion is linked to a high level of technical complexity.

SUMMARY OF THE INVENTION

Furthermore, the source and destination addresses of all the subsystems present in the vehicle are not subject to a standard addressing scheme. The addresses, therefore, need to be converted at the gateway. In addition to the technical complexity required for this, there are further time delays and additional demands on the available processor power.

The invention is based at least in part on reducing a technical complexity required for the interchange of data between various networks and/or subnetworks in a vehicle such that faster data interchange is possible with lower demands on the processor power required for the data transmission.

One embodiment of the invention comprises a network system for motor vehicles with at least two differently designed subnetworks which each have a respective data link, wherein the network layers of the at least two differently designed subnetworks are of the same design.

In this connection, it is pointed out that the terms "comprise", "with", "have", "include" and "contain", and grammatical modifications thereof, used to list features in this description and the claims generally denote a non-conclusive list of features, such as method steps, devices, ranges, variables and the like, which does not in any way rule out the presence of other or additional features or groups of other or additional features.

A standard design for the network layers of the different networks in a motor vehicle standardizes pathfinding, typically referred to as routing, flow control and other tasks relating to the data interchange, so that it is no longer necessary to convert addresses.

Advantageously, the protocol of the network layer is formed by an Internet Protocol, so that a network structure can be formed without address-converting gateways and hence additional time delays. To assist continuous transmission of multimedia data, at least one of the at least two differently designed subnetworks expediently uses a connectionless transport protocol. For secure data transmission particularly in the area of control tasks in the vehicle, at least one of the at least two differently designed subnetworks uses a connection-oriented transport protocol.

BRIEF DESCRIPTION OF DRAWINGS

Further features of the invention can be found in the following description of exemplary embodiments based on the invention in conjunction with the claims and the figures. The individual features may be implemented singularly or as a multiple in an embodiment based on the invention. The following explanation of a few exemplary embodiments of the invention makes reference to the accompanying figures, in which

FIG. 3 is a schematic of a conventional vehicle network system; and

FIG. 4 is a schematic of a vehicle network system in which different subnetworks have standard network layers.

DETAILED DESCRIPTION OF THE DRAWINGS

Figure 1:
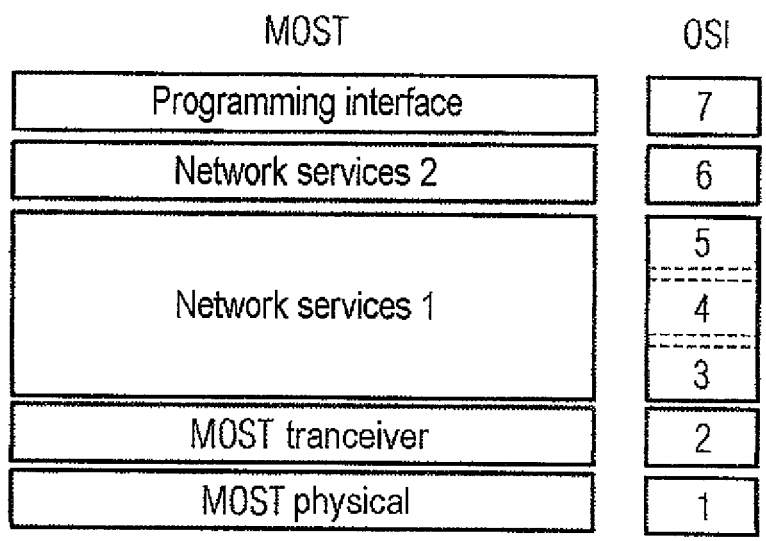
FIG. 1 is a comparison of a layer design of a MOST bus system and an OSI reference model.

In FIG. 1 compares layers of a MOST network (Media Oriented Systems Transport network) with the seven layers of the OSI reference model (Open System Interconnect). The application layer 7 from the OSI reference model is in the form of a programming interface in the MOST network. The tasks of the presentation layer 6 from the OSI reference model are performed by the "Network services 2" layer in the MOST network. The services of the communication control layer 5, transport layer 4 and network layer 3 are performed by the "network services 1" layer in the MOST network. The data link layer 2 and the physical layer 1 of the OSI reference model are called the "MOST transceiver layer" and the "MOST physical layer" in the MOST network.

Figure 2:
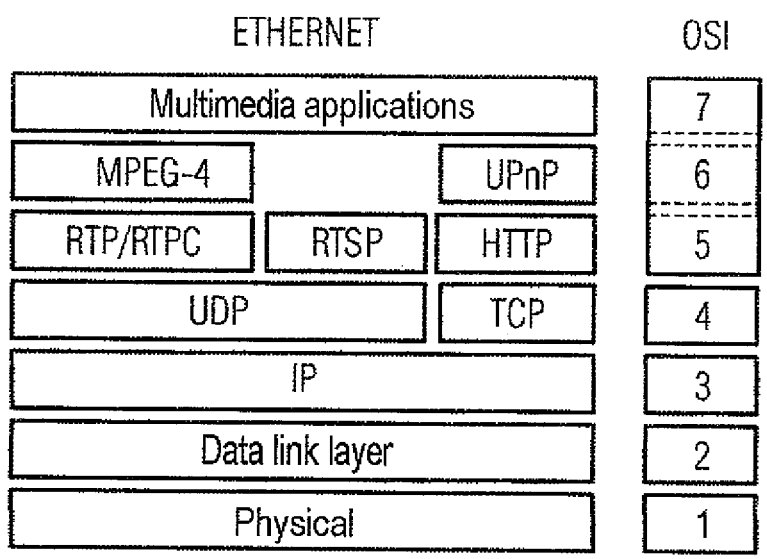
FIG. 2 is a comparison in a layer structure of an Ethernet-based multimedia network and the OSI reference model.

FIG. 2 compares layer model of a network for multimedia applications, the physical layer and data link layer of which are designed on the basis of the Ethernet standard, with the OSI reference model. The network layer of the Ethernet-based multimedia network involve an Internet Protocol. The transport layer executes both connection-oriented (TCP; Transmission Control Protocol) and connectionless (UDP; User Datagram Protocol) protocols. The latter are used particularly for streaming media, in which audio or video data are transmitted continuously via the network. Coding, packetizing and sending of multimedia data streams are performed on the session layer by the real-time transport protocol (RTP), which interacts with the real-time control protocol to negotiate and observe quality-of-service parameters (QoS). The control and inspection of the transmission of real-time-sensitive multimedia data are covered by the real-time streaming protocol (RTSP). The connection-oriented transmission of data is performed in the session layer by the hypertext transfer protocol (HTTP). For the purpose of converting the data from and for the multimedia applications based on the processing layer, MPEG-4 and UPnP are used in the presentation layer.

In the case of packet-oriented services, the task of the network layer is generally to route data packets from source to destination. It forms the lowest layer for setting up a connection between two end systems, the end systems possibly being linked to one and the same or to different networks. The network layer performs the addressing and the correct allocation of source and destination addresses. In the currently customary vehicle network systems, each subnetwork has a network layer which is of different design than the network layers of the other subnetworks. Thus there is also a difference between the address allocations in the individual subnetworks.

FIG. 3 is a schematic illustration of a conventional vehicle network system 100, in which the end systems of three different networks are connected to one another via gateways, 10, 20, 30 and 40. The gateway 10 links the end systems 11, 12, 13 and 14 of the first subnetwork to the network system 100 of the vehicle. Gateway 30 links the end systems 31, 32, 33, 34 and 35 of a second subnetwork to the network system 100 of the vehicle, said link being provided by a further gateway 20 (for example of a further subnetwork which is not shown in more detail in the figure). The end systems 41, 42, 43 and 44 of a third subnetwork are finally connected to the vehicle network system via the gateway 40.

When a message is transmitted from one of the subnetworks to another, the communication protocols need to be converted in the gateways. If the end system 11 transmits a message to the end system 43, for example, then the message needs to pass through the gateways 10, 20 and 40. This is associated in each case with a transition to the protocol of the subnetwork to which the message is being transmitted. The message can be sent by broadcasting to all the end systems in the form of a broadcast, said end systems themselves deciding whether the message is relevant to them. Alternatively, the network system may have appropriate address management, in which the subnetworks allocate messages from a source address to one or more respective appropriate destination addresses. Since the addressing takes place in the network layer, the address for the destination system of a message needs to be converted in the gateways on the way to the subnetwork of the destination system, which increases the processor power which is required for transmitting a message and extends the transmission time.

In the vehicle network system in FIG. 4, the protocols of the individual network layers are standard in all the different subnetworks. In other words, the network layers of the differently designed or structured subnetworks are of the same design. This achieves standard addressing for the end systems within the vehicle network system constructed from differently designed subnetworks. It is therefore no longer necessary for the gateways to convert the addresses of messages or data even when messages or data are transmitted from an end system in one subnetwork to an end system in another subnetwork which is of different design than the former subnetwork. Conversions on the hardware level defined by the data link layer and physical layer naturally continue to be performed using suitable switching elements.

Preferably, the protocol used for the network layer is the Internet Protocol (IP), since the vehicle network system can, as a result, be in the form of a private network, for example, which can then communicate via a gateway or a router having a worldwide-explicit IP address with other networks outside of the vehicle, for example a garage network, a navigation network or the like. The explicit Internet address of the vehicle also allows car-to-X communication to be configured in a simple manner, in particular.

The use of a standard network layer in the different subnetworks of a vehicle network system results in a significant cost reduction when networking the subnetworks, since it is possible to dispense with complex gateways, such as MOST or CAN gateways (CAN=Controller Area Network). In addition, this provides the opportunity for the simple design of redundancy in the vehicle, because the individual subnetworks in the vehicle can be connected directly to one another, which means that it becomes possible to interchange data between the individual subnetworks in different ways. This redundancy can therefore easily be used to achieve an increase in the operational reliability of the vehicle.

Since the addressing in a network layer of standard design takes place in a standard manner, explicit and transparent addressing of all the end systems in a vehicle is possible. An incorrect configuration is therefore easy to identify, which significantly reduces application and testing complexity.

Furthermore, a network layer of standard design allows hardware filtering of information, such as the definition of a maximum data rate—referenced to an end system and a packet format—for the transmission via the two hardware-related layers.

In addition, the use of a standard network layer in the different networks of a vehicle allows standalone systems which were previously operated independently of one another in the vehicle, such as multimedia, telephone, television, navigation, driver assistance or the like, to be integrated. Furthermore, the explicit addressing achieved for a network layer of standard design substantially prevents data from being delivered incorrectly on account of erroneous readdressing in the gateways. This allows a further increase in vehicle safety.

The use of the Internet Protocol in the network layer primarily allows simple reuse of protocols which have been standardized in the field of end user appliances. By way of example, these include the Session Initiative Protocol (SIP) and Real Time Transport Protocol (RIP) used for VoIP (voice over IP). The use of the Internet Protocol in a network layer of standard design also allows the processing of IP-based services, such as DVB-H (Digital Video Broadcasting for handheld appliances), VoIP (voice over IP), IP radio, IP navigation or other radio services, which simplifies the integration of multimedia services in the vehicle.

Furthermore, the standard network layer based on the Internet Protocol can be used to implement multiuser multimedia in a vehicle, since, if a video stream is already being transmitted in the network system of the vehicle, for example, it is a simple matter for a second multimedia user to access this video stream on the basis of the explicit source address of the video stream. Since the address allocation in the Internet Protocol is also explicit, it is also possible for new end systems, such as a new radio set, to be easily and safely incorporated into the network system of the vehicle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A network system for a motor vehicle, comprising:
a first subnetwork arranged in the motor vehicle and having a first configuration including a first data link layer; and
a second subnetwork arranged in the motor vehicle and having a second configuration that is different than the first configuration and including a second data link layer,
wherein respective network layers of the first and second subnetworks are of the same design such that a same addressing scheme is used for end systems on the first and second subnetworks, and
whereby addressing between the first and second subnetwork is performed without address conversion by a gateway for a respective end system in a respective subnetwork.

2. The network system as claimed in claim 1, wherein a protocol of the network layer is an Internet Protocol.

3. The network system as claimed in claim 2, wherein at least one of the first and second subnetworks uses a connectionless transport protocol.

4. The network system as claimed in claim 2, wherein at least one of the first and second subnetworks uses a connection-oriented transport protocol.

5. The network system as claimed in claim 1, wherein at least one of the first and second subnetworks uses a connectionless transport protocol.

6. The network system as claimed in claim 5, wherein at least one of the first and second subnetworks uses a connection-oriented transport protocol.

7. The network system as claimed in claim 1, wherein at least one of the first and second subnetworks uses a connection-oriented transport protocol.

8. The network system as claimed in claim 1, wherein the first subnetwork is a MOST (Media Oriented Systems Transport) network and the second subnetwork is an Ethernet network.

9. The network system as claimed in claim 8, wherein a maximum data rate is defined for communication between the at least the first subnetwork and the second subnetwork.

10. The network system as claimed in claim 9, wherein a packet format is defined for communication between the at least the first subnetwork and the second subnetwork.

11. The network system as claimed in claim 8, wherein a packet format is defined for communication between the at least the first subnetwork and the second subnetwork.

* * * * *